US000001084H

United States Statutory Invention Registration [19]

[11] Reg. Number: H1084

Bylenok et al.

[43] Published: Aug. 4, 1992

[54] ULTRASONIC THICKNESS MEASURING AND IMAGING SYSTEM AND METHOD

[75] Inventors: Paul J. Bylenok, Clifton Park; William M. Patmos, Schenectady; Thomas A. Wagner, Bronswick; Francis H. Martin, Melrose, all of N.Y.

[73] Assignee: The United States of America as represented by the Department of Energy, Washington, D.C.

[21] Appl. No.: 565,524

[22] Filed: Aug. 10, 1990

[51] Int. Cl.[5] ..... G01N 29/00

[52] U.S. Cl. ..... 73/602; 73/620; 73/622; 73/627

[58] Field of Search ..... 73/602, 622, 623, 634, 73/640, 620, 627, 642, 644

[56] References Cited

U.S. PATENT DOCUMENTS

| | | | |
|---|---|---|---|
| 3,908,446 | 9/1975 | Mruk | 73/642 |
| 4,567,759 | 2/1986 | Ekstrom et al. | 73/152 |
| 4,597,294 | 7/1986 | Brill, III et al. | 73/623 |
| 4,685,966 | 8/1987 | Garner et al. | 73/634 |

*Primary Examiner*—Bernarr E. Gregory
*Attorney, Agent, or Firm*—Virginia B. Caress; William R. Moser; Richard E. Constant

[57] ABSTRACT

An ultrasonic thickness measuring and imaging system uses an ultrasonic focused beam probe for measuring thickness of an object, such as a wall of a tube, a computer for controlling movement of the probe in a scanning pattern within the tube and processing an analog signal produced by the probe which is proportional to the tube wall thickness in the scanning pattern, and a line scan recorder for producing a record of the tube wall thicknesses measured by the probe in the scanning pattern. The probe is moved in the scanning pattern to sequentially scan circumferentially the interior tube wall at spaced apart adjacent axial locations. The computer processes the analog signal by converting it to a digital signal and then quantifies the digital signal into a multiplicity of thickness points with each falling in one of a plurality of thickness ranges corresponding to one of a plurality of shades of grey. From the multiplicity of quantified thickness points, a line scan recorder connected to the computer generates a pictorial map of tube wall thicknesses with each quantified thickness point thus being obtained from a minute area, e.g. 0.010 inch by 0.010 inch, of tube wall and representing one pixel of the pictorial map. In the pictorial map of tube wall thicknesses, the pixels represent different wall thicknesses having different shades of grey.

23 Claims, 2 Drawing Sheets

Microfiche Appendix Included
(1 Microfiche, 80 Pages)

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

ULTRASONIC THICKNESS MEASURING AND IMAGING SYSTEM AND METHOD

RIGHTS OF THE GOVERNMENT

The U.S. Government has rights in this invention pursuant to Contract No. DE-AC12-76SN00052 awarded by the U.S. Department of Energy to General Electric Corporation.

MICROFICHE APPENDIX

A computer program used in the system and method of the present invention is being provided with this application and is incorporated herein by reference to fulfill the description, enablement, and best mode provisions of the Patent Laws; however, a detailed understanding of the computer program is not necessary for understanding the present invention. The computer program is in the form of one microfiche card containing 80 frames.

BACKGROUND OF THE INVENTION

1. Field of the Invention

The present invention relates generally to corrosion testing of steam generator tubes and, more particularly, is concerned with a nondestructive ultrasonic system and method for measuring and imaging the thickness of steam generator tubes to determine corrosion attack depths.

2. Description of the Prior Art

Heat produced by fission in a nuclear reactor core of a nuclear power plant is transferred to a primary reactor coolant flowing through the reactor core. The primary reactor coolant then flows through steam generators of the nuclear power plant where it transfers the heat to a secondary feedwater which is transformed thereby into steam. The steam is used to generate electricity by driving a conventional steam turbine-electrical generator apparatus.

Each steam generator has a large bundle of tubes. The high temperature primary reactor coolant flows through the secondary interior of the tubes in heat exchange relationship with the feedwater flowing along the exterior of the tubes. The primary reactor coolant flowing through the steam generator tubes is a source of corrosion of the walls of the tubes which reduces wall thickness and can eventually lead to wall perforations.

As a result, long term corrosion tests of steam generator tubes are conducted in order to understand the corrosion generating mechanism and to determine typical steam generator tube corrosion rates. Depth of corrosion damage of tube specimens found by these tests is normally 0.003 to 0.005 inch. Several testing methods have been used to measure the corrosion attack depths, both destructive and nondestructive of the tube specimen undergoing inspection.

A destructive testing method employed in the past is surface profilometry to measure corrosion attack depth. This method of damage determination is satisfactory from the standpoint that its minimum sensitivity to attack depth of 0.001 inch is less than the typical corrosion depths encountered of 0.003–0.005 inch. However, it is unsatisfactory because it requires destructive sectioning of the tube in that tube specimens must be cut to size and descaled to remove deposits before profilometry can be performed. Destruction of test specimens means that resumption of long term tests following interim examinations with the same test specimens, which is highly desirable, is not possible. Thus, the rate of damage growth in long term corrosion tests has not been measured, but instead has been inferred by comparing the profilometry results from different specimens which operated for various periods of time. This is considered unsatisfactory since damage rates are not reproducible on all specimens within a test.

Two nondestructive testing methods have been used heretofore to determine attack depths during interim examinations of long term tests. These inspection methods include eddy current testing (ET) and ultrasonic test measuring (UTM). The ET method has been unsatisfactory for laboratory tests because the typical attack depths encountered of 0.003–0.005 inch are less than the maximum sensitivity of this technique of 0.005–0.010 inch, or 10% of the tube wall thickness. Therefore, ET provides useful detection but does not provide useful sizing information concerning the early stages of corrosion. In contrast thereto, the UTM method is capable of determining the normally observed attack depths of 0.003–0.005 inch since its minimum sensitivity is 0.001 inch and with focused beam probes measure an area of approximately 0.010 inch by 0.010 inch.

The UTM method is performed by placing an ultrasonic probe inside the tube. The tube is filled with water to allow the ultrasonic wave to travel from the probe through the water and into the tube wall. The reflected ultrasonic wave is monitored by the same probe. The time required for the ultrasonic wave to complete a round trip in the tube wall is proportional to the tube wall thickness. The relationship between wave travel time and tube thickness is:

$$T=(vt)/2$$

where:

T = tube wall thickness (inches)

v = velocity of ultrasound in Inconel (0.23 inch/micro-sec, a material constant)

t = travel time (micro-seconds).

Since the nondestructive ultrasonic test method is capable of determining the normally observed attack depths, its use is desirable. However, this inspection method is currently manually operated, and the associated data reduction is also performed manually. Because of the large manpower effort required to perform and evaluate ultrasonic tube inspections, effective use of this desired method is not feasible.

Consequently, a need exists for a way to automate data collection and reduction associated with the UTM method of testing tubes so as to make its use feasible.

SUMMARY OF THE INVENTION

The present invention provides an ultrasonic thickness measuring and imaging (UTMI) system and method designed to satisfy the aforementioned needs. The UTMI system and method of the present invention automates data collection and reduction and provides a permanent, accurate record of corrosion damage which can be used for comparison with past and/or future inspection results.

In accordance with the present invention, the UTMI system basically utilizes inspecting means having an ultrasonic probe for measuring thickness of an object, such as a wall of a tube, means coupled to the inspecting means for controlling movement of the probe in a scanning pattern with respect to the object and for receiving and processing an analog signal produced by the probe which is proportional to object thicknesses in the scanning pattern, and image generating means in the form of a line scan recorder coupled to the controlling and processing means for producing a recorded image of the object thicknesses measured by the probe in the scanning pattern. The probe is moved in the scanning pattern to sequentially scan the object at spaced apart adjacent locations.

The controlling and processing means is a computer which positions the probe, captures the analog signal, converts the analog signal to a digital signal, and then quantifies the digital signal into a multiplicity of thickness points with each falling in one of a plurality of thickness ranges corresponding to one of a plurality of shades of grey. From the multiplicity of quantified thickness points, the line scan recorder generates a pictorial map of object thicknesses with each quantified thickness point thus being obtained from a minute area of object and representing one pixel of the pictorial map.

In the pictorial map of object thicknesses, the pixels which are the blackest shade of grey represent object areas of minimum thickness, whereas the pixels which are the whitest shade of grey represent object areas of maximum thickness. The other pixels in shades of grey ranging from blackest to whitest represent object areas which incrementally increase from the minimum to maximum thickness.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

Figure 1:
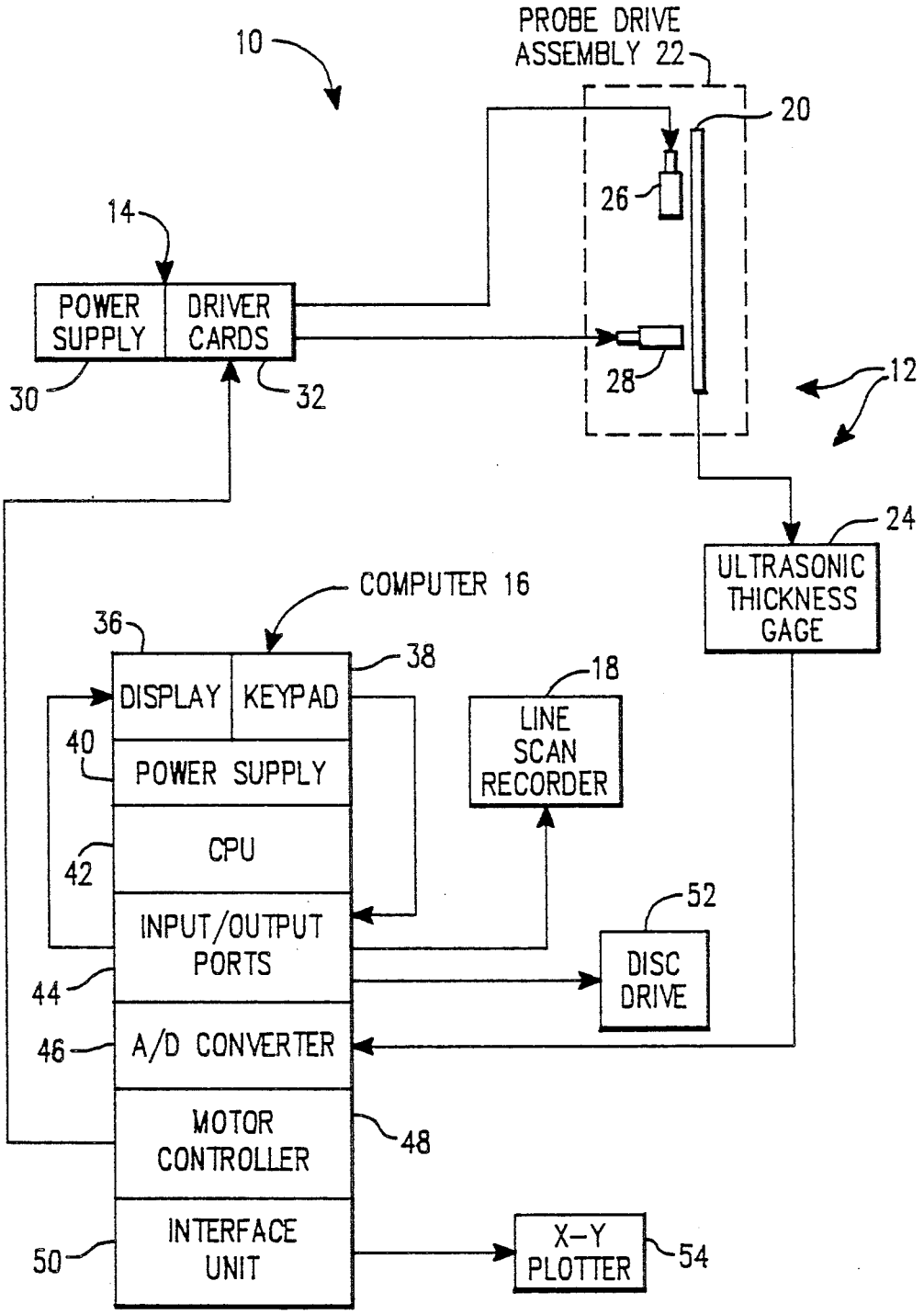
FIG. 1 is a block diagram of an ultrasonic thickness measuring and imaging (UTMI) system in accordance with the present invention.

In the following description, like reference characters designate like or corresponding parts throughout the several views of the drawings. Also in the following description, it is to be understood that such terms as "forward", "rearward", "left", "right", "upward", "downward", and the like are words of convenience and are not to be construed as limiting terms.

Referring now to the drawings, and particularly to FIG. 1, there is shown an ultrasonic thickness measuring and imaging (UTMI) system, generally designated 10 and comprising the present invention. It should be understood that the UTMI system 10 can be used to ultrasonically measure, and generate a recorded image of, the thicknesses of objects of various configurations. Herein the system 10 is described in conjunction with the ultrasonic measurement and generation of a recorded image of the thicknesses of a tube (not shown), such as a steam generator tube attached to a tube sheet (not shown). In its basic components, the UTMI system 10 includes an ultrasonic inspecting means 12, driving means 14, controlling and processing means 16, and image generating means 18.

More particularly, the ultrasonic inspecting means 12 of the UTMI system 10 include an ultrasonic probe 20, a probe drive assembly 22, and an ultrasonic thickness gage 24 for ultrasonically inspecting the steam generator tube and generating an analog signal proportional to the wall thicknesses of the tube. The probe drive assembly 22 has first and second mechanisms in the form of stepping motors 26 and 28 for driving the probe 20 and respectively producing axial movement of the probe 20 to position it at successively spaced apart axial locations and rotational movement of the probe 20 to scan the interior tube wall in a predetermined pattern circumferentially at each of the axial locations. The ultrasonic thickness gage 24 is coupled to the ultrasonic probe 20 for receiving a measurement signal from the probe 20 and generating the analog signal. The ultrasonic probe 20, probe drive assembly 22 and ultrasonic thickness gage 24 per se are well-known conventional components and thus are only illustrated in block diagram form. By way of example, the ultrasonic probe 20 and thickness gauge 24 can be components commercially available from supplier, Panametrics, and identified by model numbers 3522 and 5215. The probe drive assembly 22 can be a component commercially available from supplier, Velmex, and identified by model number 85144.

The driving means 14 of the UTMI system 10 is coupled to the probe drive assembly 22 of the inspecting means 12 for driving the probe 20 via the stepping motors 26 and 28 to scan the interior of the tube along its axis and about its circumference in the predetermined pattern. The driving means 14 includes a power supply 30 and driver cards 32, each being per se well-known conventional components and thus illustrated only in block diagram form in FIG. 1. For example, the driving means 14 can be a component commercially available from supplier, Superior Electric, and identified by the model numbers SKD-112 with DRD002A and PSD 048B.

The controlling and processing means 16 of the UTMI system 10 is coupled to the driving means 14 for outputting thereto a predetermined sequence of signals to control the driving means 14 in driving the probe 20 of the inspecting means 12 to scan the tube interior in the desired predetermined pattern. The means 16 is also coupled to the inspecting means 12 for receiving the analog signal from the ultrasonic thickness gage 24. Preferably, the controlling and processing means 16 is a microprocessor or computer 16 having the components shown in block diagram form in FIG. 1 as follows: a display 36, keypad 38 and power supply 40; a central processing unit (CPU) 42 (including random assess memory or RAM); input and output ports 44; an analog-to-digital (A/D) converter 46; a motor controller 48; and an interface unit 50. A computer 16 having these components is per se well-known conventional unit and thus need not be illustrated nor described in greater detail. For example, the display 36 can be a component commercially available from supplier, Deco, and identified by the model number M2400. The keyboard 38 can be a component commercially available from supplier, Microswitch, and identified by model number 16CT1-1. The CPU 42 and I/O ports 44 can be components commercially available from a supplier, Prolog, and identified by model numbers 7801-1 and 7604A. The motor controller 48 can be a component commercially available from supplier, Matrix, and identified by model number 7911.

The motor controller 48 of the computer 16 outputs the sequence of signals to control the driving means 14 as mentioned above. The A/D converter 46 of the computer 16 receives and converts the analog signal into a digital signal and the CPU 42 of the computer 16, as directed by a program stored in read-only memory (ROM), quantifies the digital signal into a multiplicity of thickness points in the predetermined pattern with each point falling in one of plurality of different thickness ranges. The stored program, a listing of which is contained in the Appendix hereto, directs the various components of the computer in coordinating and carrying out their respective assigned operations.

Figure 2:
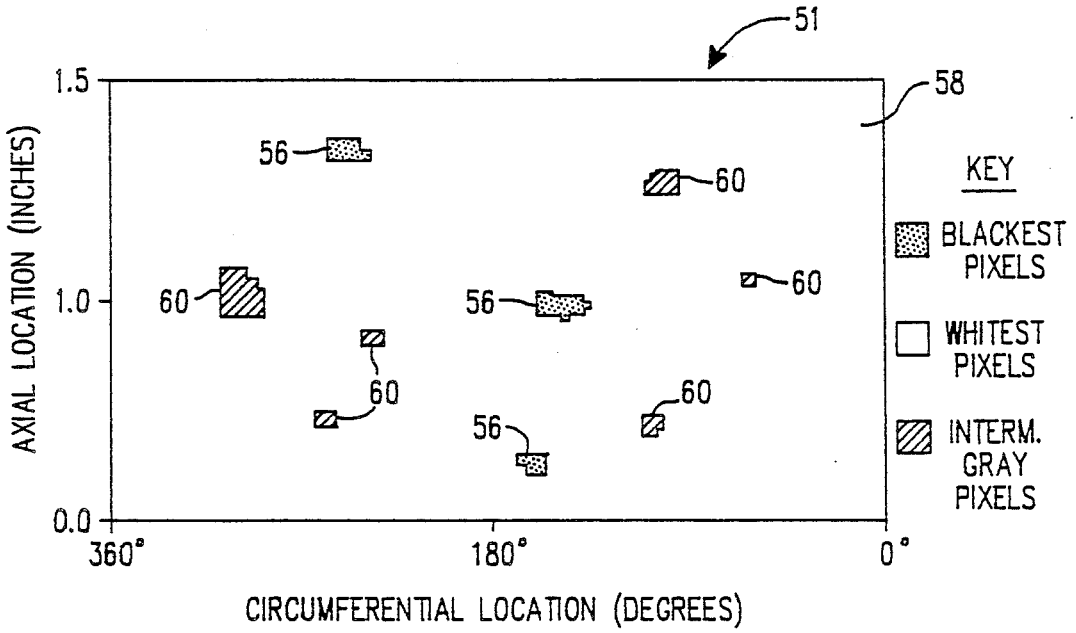
FIG. 2 is a representation of a pictorial map of tube wall thicknesses generated by the UTMI system of FIG. 1.

The image generating means 18 of the UTMI system 10 is preferably a line scan recorder 18 coupled to the computer 16 via the input and output ports 44 for generating an image of tube wall thicknesses in the predetermined pattern in the form of a pictorial map 51, as seen in FIG. 2, from the multiplicity of quantified thickness points. Each quantified thickness point on the pictorial map 51 is obtained from a minute area of tube wall and represents one pixel of the pictorial map. Optionally, the UTMI system 10 can also utilize a disc drive 52 and a X-Y recorder 54 coupled to the computer 16. The disc drive 52 is provided for storing the digitized representation of the analog signal on a floppy disc (not shown). The X-Y recorder 54 is provided for generating a plot of thickness versus axial distance when the probe 20 is moved axially at a given circumferential location.

Referring to FIG. 2, each of the pixels composing the pictorial map 51 has one of a plurality of different shades of grey, for example one of sixteen. Each different shade of grey corresponds to one of the different thickness ranges containing each thickness point. The pixels 56 in the blackest shade of grey represent tube wall areas of minimum thickness, such as 0.025 inch or less, whereas the pixels 58 in the whitest shade of grey represent tube wall areas of maximum thickness, such as 0.050 inch. The pixels 60 in shades of grey ranging from blackest to whitest represent tube wall areas which incrementally increase from the minimum to maximum thickness.

Figure 3:
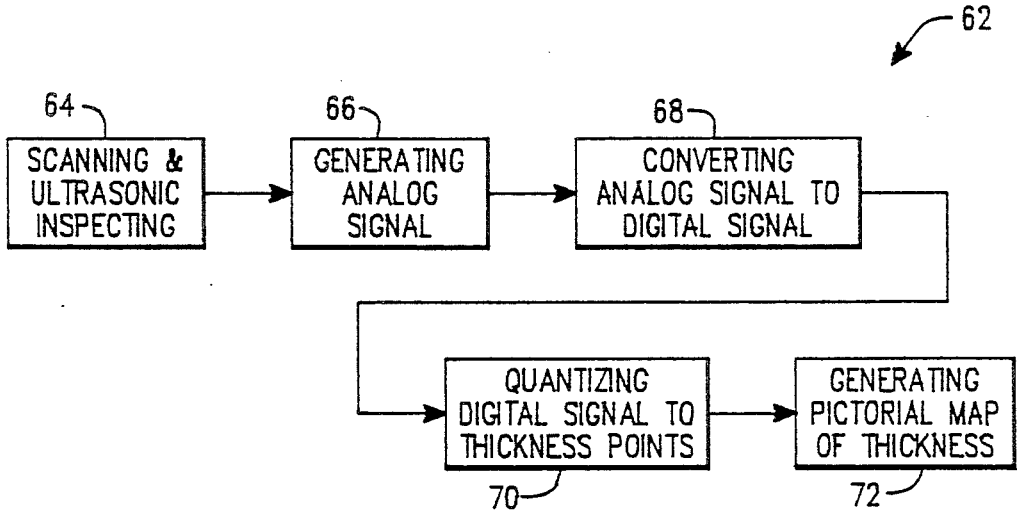
FIG. 3 is a flow diagram of the UTMI method in accordance with the present invention.

FIG. 3 is a flow diagram 62 of the UTMI method of the present invention. To perform the UTMI method employing the system 10, first, as per block 64 of flow diagram 62, the interior of a tube is scanned and ultrasonically inspected by sequential movement of the ultrasonic probe 20 along the tube axis and about the tube circumference in the desired pattern. As per block 66 of flow diagram 62, the ultrasonic thickness gage 24 in conjunction with the scanning probe 20 generates an analog signal proportional to the wall thicknesses of the tube in the predetermined scanned pattern. As per block 68 of flow diagram 62, the analog signal representing thicknesses of the tube wall scanned in the predetermined pattern is received by the computer 16 where the signal is converted from an analog signal to a digital signal employing the A/D converter 46 of the computer. Thereafter, as per block 70 of flow diagram 62, the CPU 42 of the computer 16 quantifies the digital signal into a multiplicity of thickness points in the predetermined pattern with each point falling in one of plurality of different thickness ranges, such as sixteen thickness ranges. From the multiplicity of quantified thickness points in the scanned pattern, as per block 72 of flow diagram 62, the line scan recorder 18 generates a pictorial map 51 of wall thicknesses of the tube in the pattern. Each quantified thickness point on the pictorial map 51 is obtained from a minute area (such as 0.004 inch by 0.004 inch) of tube wall and represents one pixel of the pictorial map. As described above with reference to FIG. 2, each of the pixels composing the pictorial map 51 has one of a plurality of different shades of grey, for example one of sixteen.

More particularly, the probe 20 can be moved inside of the tube filled with water to various elevations and angular positions. In the predetermined scanning pattern, the probe 20 will be stepped 0.005 inch in the axial direction along its axis by operation of the stepping motor 26 and then rotated 360° in the circumferential direction about its axis by operation of the stepping motor 28. The thickness data will be recorded automatically as the probe 20 rotates. These steps will be repeated until the entire tube wall length of interest is scanned in the predetermined pattern as controlled by the computer 16 via the driving means 14.

It is thought that the present invention and many of its attendant advantages will be understood from the foregoing description and it will be apparent that various changes may be made in the form, construction and arrangement without departing from the spirit and scope of the invention or sacrificing all of its material advantages, the form hereinbefore described being merely a preferred or exemplary embodiment thereof.

We claim:

1. An ultrasonic thickness measuring and imaging system, comprising:

(a) means for ultrasonically inspecting an object with a focused beam probe and generating an analog signal proportional to the thickness of the object;

(b) means coupled to said inspecting means for driving said inspecting means to scan the object in a predetermined pattern;

(c) means coupled to said driving means for generating and outputting to said driving means a driving signal to control said driving means in driving said inspecting means to scan the object in the predetermined pattern;

(d) means coupled to said inspecting means for receiving the analog signal therefrom representing thicknesses of the object scanned in the predetermined pattern and for converting the analog signal into a digital signal and quantifying the digital signal into a multiplicity of thickness points in the scanned pattern with each point falling in one of a plurality of different thickness ranges; and (e) means coupled to said converting and quantifying means for receiving the quantified digital signal and generating a pictorial map of wall thicknesses of the object in the predetermined pattern from the multiplicity of quantified thickness points, each quantified thickness point on the pictorial map being obtained from a minute area of the object and representing one pixel of the pictorial map.

2. The system as recited in claim 1, wherein said inspecting means is driven by said driving means to scan the object at spaced apart locations in order to measure the thicknesses of the object.

3. The system as recited in claim 1, wherein said inspecting means includes:

an ultrasonic focused beam probe; and a probe drive assembly having first and second mechanisms for driving said probe and respectively producing movement of said probe to position said probe at successive spaced apart locations to scan the object in the predetermined pattern.

4. The system as recited in claim 3, wherein said inspecting means also includes an ultrasonic thickness gage coupled to said ultrasonic probe for generating the analog signal.

5. The system as recited in claim 3, wherein said first and second driving mechanisms are stepping motors.

6. The system as recited in claim 1, wherein said pictorial map generating means is a line scan recorder.

7. The system as recited in claim 1, wherein the pixels composing the pictorial map have one of a plurality of different shades of grey, each different shade of grey corresponding to one of the different thickness ranges containing each thickness point.

8. The system as recited in claim 7, wherein the pixels in the blackest shade of grey represent object areas of minimum thickness, whereas the pixels in the whitest shade of grey represent object areas of maximum thickness, and wherein each pixel represents an area of the object no greater than approximately 0.010 inch by 0.010 inch.

9. The system as recited in claim 8, wherein the pixels in shades of grey ranging from blackest to whitest represent object areas which incrementally increase from the minimum to maximum thickness.

10. An ultrasonic thickness measuring and imaging system, comprising:

(a) means for ultrasonically inspecting a tube and generating an analog signal proportional to the wall thickness of the tube, said inspecting means including an ultrasonic focused beam probe and a probe drive assembly having first and second mechanisms for driving said probe and respectively producing axial movement of said probe to position said probe at successive spaced apart axial locations and rotational movement of said probe to scan the interior tube wall at each of the axial locations;

(b) means coupled to said inspecting means for driving said inspecting means to scan the interior of the tube along the axis and about the circumference of the tube in a predetermined pattern;

(c) a computer coupled to said driving means for generating and outputting to said driving means a predetermined sequence of signals to control said driving means in driving said inspecting means to scan the tube interior in the predetermined pattern;

(d) said computer also coupled to said inspecting means for receiving the analog signal therefrom representing thicknesses of the tube wall scanned in the predetermined pattern and for processing the analog signal by converting the analog signal into a digital signal and quantifying the digital signal into a multiplicity of thickness points in the predetermined pattern with each point falling in one of a plurality of different thickness ranges; and (e) a line scan recorder coupled to said computer for receiving the quantified digital signal and generating a pictorial map of tube wall thicknesses in the predetermined pattern from the multiplicity of quantified thickness points, each quantified thickness point on the pictorial map being obtained from a minute area of tube wall no greater than (0.010 in.) 2 and representing one pixel of the pictorial map.

11. The system as recited in claim 10, wherein said inspecting means also includes an ultrasonic thickness gage coupled to said ultrasonic probe for generating the analog signal.

12. The system as recited in claim 10, further comprising:

a X-Y recorder coupled to said computer for generating a plot of thickness versus axial distance when said probe is moved axially at a given circumferential location.

13. The system as recited in claim 10, wherein the pixels composing the pictorial map have one of a plurality of different shades of grey, each different shade of grey corresponding to one of the different thickness ranges containing each thickness point.

14. The system as recited in claim 13, wherein the pixels in the blackest shade of grey represent tube wall areas of minimum thickness, whereas the pixels in the whitest shade of grey represent tube wall areas of maximum thickness.

15. The system as recited in claim 14, wherein the pixels in shades of grey ranging from blackest to whitest represent tube wall areas which incrementally increase from the minimum to maximum thickness.

16. An ultrasonic thickness measuring and imaging method, comprising the steps of:

(a) scanning an object in a predetermined pattern;

(b) ultrasonically inspecting the object with a focused beam probe in the predetermined pattern and generating an analog signal proportional to the thicknesses of the object in the predetermined pattern;

(c) receiving the analog signal representing thicknesses of the object scanned in the predetermined pattern and converting the analog signal into a digital signal;

(d) quantifying the digital signal into a multiplicity of thickness points in the predetermined pattern with each point falling in one of a plurality of different thickness ranges; and (e) receiving the quantified digital signal and generating a pictorial map of thicknesses of the object in the predetermined pattern from the multiplicity of quantified thickness points, each quantified thickness point on the pictorial map being obtained from a minute area no greater than (0.010 in.) 2 of the object and representing one pixel of the pictorial map.

17. The method as recited in claim 16, wherein said map generating includes generating the pixels which compose the pictorial map such that each has one of a plurality of different shades of grey, each different shade of grey corresponding to one of the different thickness ranges containing each thickness point.

18. The method as recited in claim 17, wherein said map generating includes generating the pixels which represent object areas of minimum thickness in the blackest shade of grey and generating the pixels which represent object areas of maximum thickness in the whitest shade of grey.

19. The method as recited in claim 18, wherein said map generating includes generating the pixels which represent object areas which incrementally increase from the minimum to maximum thickness in shades of grey ranging from blackest to whitest.

20. An ultrasonic thickness measuring and imaging method, comprising the steps of:

(a) scanning the interior of a tube along its axis and about its circumference in a predetermined pattern;

(b) ultrasonically inspecting the tube with a focused beam probe in the predetermined pattern and generating an analog signal proportional to the wall thicknesses of the tube in the predetermined pattern;

(c) receiving the analog signal representing thicknesses of the tube wall scanned in the predetermined pattern and converting the analog signal into a digital signal;

(d) quantifying the digital signal into a multiplicity of thickness points in the predetermined pattern with each point falling in one of a plurality of different thickness ranges; and (e) receiving the quantified digital signal and generating a pictorial map of wall thicknesses of the tube in the predetermined pattern from the multiplicity of quantified thickness points, each quantified thickness point on the pictorial map being obtained from a minute area of tube wall and representing one pixel of the pictorial map.

21. The method as recited in claim 20, wherein said map generating includes generating the pixels which compose the pictorial map such that each has one of a plurality of different shades of grey, each different shade of grey corresponding to one of the different thickness ranges containing each thickness point.

22. The method as recited in claim 21, wherein said map generating includes generating the pixels which represent tube wall areas of minimum thickness in the blackest shade of grey and generating the pixels which represent tube wall areas of maximum thickness in the whitest shade of grey.

23. The method as recited in claim 22, wherein said map generating includes generating the pixels which represent tube wall areas no greater than (0.010 in.) 2 which incrementally increase from the minimum to maximum thickness in shades of grey ranging from blackest to whitest.

* * * * *